(12) United States Patent
Lee et al.

(10) Patent No.: US 7,838,161 B2
(45) Date of Patent: Nov. 23, 2010

(54) REFORMER AND FUEL CELL SYSTEM USING THE SAME

(75) Inventors: Sung Chul Lee, Yongin-si (KR); Ju Yong Kim, Seoul (KR); Chan Ho Lee, Yongin-si (KR); Dong Myung Suh, Yongin-si (KR); Jin Kwang Kim, Yongin-si (KR); Jin Goo Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 601 days.

(21) Appl. No.: 11/595,339

(22) Filed: Nov. 10, 2006

(65) Prior Publication Data

US 2007/0082238 A1 Apr. 12, 2007

(30) Foreign Application Priority Data

Nov. 10, 2005 (KR) ..................... 10-2005-0107752

(51) Int. Cl.
*H01M 8/06* (2006.01)
(52) U.S. Cl. .................. 429/429; 429/412; 429/420; 429/433
(58) Field of Classification Search ............ 429/17, 429/19, 20, 26, 34; 422/198; *C01B 3/00, C01B 3/02, 3/22, 3/50, 3/58; H01M 8/04*
See application file for complete search history.

(56) References Cited

U.S. PATENT DOCUMENTS

| | | | | |
|---|---|---|---|---|
| 3,186,797 | A * | 6/1965 | Pearce et al. ................ | 252/376 |
| 4,522,894 | A * | 6/1985 | Hwang et al. ................ | 429/17 |
| 5,741,474 | A | 4/1998 | Isomura et al. | |
| 7,670,987 | B2 | 3/2010 | Kawashima et al. | |
| 2003/0093949 | A1 * | 5/2003 | Goebel et al. .............. | 48/127.9 |
| 2003/0138688 | A1 * | 7/2003 | Hattori et al. ................ | 429/34 |
| 2004/0182002 | A1 | 9/2004 | Malhotra et al. | |

(Continued)

FOREIGN PATENT DOCUMENTS

CN 1647304 A 7/2005

(Continued)

OTHER PUBLICATIONS

Patent Abstracts of Japan, Publication No. 2004-323278, dated Nov. 19, 2004, in the name of Yoshiharu Nakaji.

(Continued)

*Primary Examiner*—Jennifer K Michener
*Assistant Examiner*—Heng M Chan
(74) *Attorney, Agent, or Firm*—Christie, Parker & Hale, LLP (57) ABSTRACT

A reformer that directly receives heat and performs an ATR catalyst reaction and an SR catalyst reaction. The reformer includes: a reforming reactor to reform hydrogen containing fuel into reformed gas having abundant hydrogen by performing an ATR catalyst reaction and an SR catalyst reaction; a heat source contacting one side of the reforming reactor and providing the reforming reactor with heat; and an air feeder to feed the reforming reactor with air by an air flow control unit. Thus, the ATR catalyst reaction featuring a relatively short preheating time is performed while the reformer is initially operated, so that hydrogen can be produced when the reformer is initially operated, thereby efficiently operating a fuel cell.

13 Claims, 3 Drawing Sheets

U.S. PATENT DOCUMENTS

| | | | |
|---|---|---|---|
| 2005/0089732 A1* | 4/2005 | Aoyama et al. | 429/20 |
| 2005/0188843 A1 | 9/2005 | Edlund et al. | |
| 2005/0217178 A1 | 10/2005 | Aoyama | |
| 2005/0227129 A1* | 10/2005 | Iio | 429/20 |
| 2005/0244685 A1 | 11/2005 | Kim et al. | |
| 2006/0168887 A1 | 8/2006 | Baumann et al. | |

FOREIGN PATENT DOCUMENTS

| | | |
|---|---|---|
| CN | 1662441 A | 8/2005 |
| EP | 0 983 963 A2 | 3/2000 |
| EP | 1 160 193 A1 | 12/2001 |
| JP | 2000-319004 | 11/2000 |
| JP | 2003-081603 | 3/2003 |
| JP | 2003-95611 | 4/2003 |
| JP | 2003-288927 | 10/2003 |
| JP | 2004-115365 | 4/2004 |
| JP | 2004-269343 | 9/2004 |
| JP | 2004-323278 | 11/2004 |
| JP | 2004-339007 | 12/2004 |
| JP | 3646625 | 2/2005 |
| JP | 2005-206395 | 8/2005 |
| KR | 2003-0004011 | 1/2003 |
| KR | 10-2004-0079991 | 9/2004 |
| KR | 10-2005-0083902 | 8/2005 |
| WO | WO 00/66486 A1 | 11/2000 |
| WO | WO 2004000724 A1 * | 12/2003 |
| WO | WO 2004/046026 A1 | 6/2004 |
| WO | WO 2005/079978 A1 | 9/2005 |

OTHER PUBLICATIONS

Korean Patent Abstracts, Publication No. 1020030004011 A, dated Jan. 14, 2003, in the name of Kazutoshi Higashiyama et al.

Patent Abstracts of Japan, Publication 2000-319004, Published Nov. 21, 2000, in the name of Goto.

Patent Abstracts of Japan, Publication 2001-348206, Published Dec. 18, 2001, in the name of Ichikawa, et al., corresponding to JP 3646625.

Patent Abstracts of Japan, Publication 2003-095611, Published Apr. 3, 2003, in the name of Hirao, et al.

Patent Abstracts of Japan, Publication 2005-206395, Published Aug. 4, 2005, in the name of Asou, et al.

SIPO Office action dated Dec. 18, 2009, for corresponding Chinese application 200610138273.8, noting listed reference in this IDS.

Extended European Search Report dated Nov. 26, 2009 in corresponding European application No. 06123791, listing the cited references in this IDS.

Japanese Office action dated Aug. 18, 2009, for corresponding Japanese application 2006-220098, noting listed references in this IDS, as well as JP 2004-323278 previously filed in an IDS dated Jan. 23, 2007.

SIPO Office action dated Sep. 4, 2009, for corresponding Chinese Patent application 200610138273.8, with English translation, noting listed Chinese and International Publication references listed in this IDS.

* cited by examiner

REFORMER AND FUEL CELL SYSTEM USING THE SAME

CROSS-REFERENCE TO RELATED APPLICATIONS

This application claims priority to and the benefit of Korean Patent Application No. 2005-107752, filed on Nov. 10, 2005, in the Korean Intellectual Property Office, the disclosure of which is incorporated herein by reference.

BACKGROUND

1. Field of the Invention

The present invention relates to a reformer, and more particularly, to a reformer having a catalyst capable of performing an auto-thermal catalyst reaction and a steam reforming catalyst reaction according to the type of reaction material introduced into the reforming reactor.

2. Discussion of Related Art

A fuel cell is a power generating system that directly transforms chemical energy into electric energy by an electrochemical reaction between hydrogen and oxygen. In supplying hydrogen to a fuel cell system, pure hydrogen can be directly used, or methanol, ethanol, natural gas or the like can be reformed. Further, in supplying oxygen to the fuel cell system, pure oxygen can be directly used, or oxygen contained in air can be supplied by an air pump or the like.

Meanwhile, the fuel cell is classified into a polymer electrolyte membrane fuel cell (PEMFC) and a direct methanol fuel cell (DMFC), which operate at room temperature or a temperature of less than 100° C.; a phosphoric acid fuel cell (PAFC) which operates at a temperature of 150° C.~200° C.; a molten carbon fuel cell (MCFC) which operates at a temperature of 600° C.~700° C.; a solid oxide fuel cell (SOFC) which operates at a high temperature of more than 1000° C.; and so on. These fuel cells operate on basically the same principle, but they are different in the type of fuel, catalyst, and electrolyte utilized.

Among the fuel cells, the polymer electrolyte membrane fuel cell (PEMFC) uses hydrogen obtained by reforming methanol, ethanol, natural gas, etc., and has advantages as compared with other types of fuel cells in that its output performance is very excellent; its operation temperature is low; and its start and response are quickly performed. Thus, the PEMFC can be widely used as a distributed power source for a house or a public building, a small portable power source for a portable electronic apparatus, etc. as well as a transportable power source for a vehicle.

The PEMFC includes a fuel container to store fuel, a reformer to produce hydrogen by reforming the fuel, and an electric generator to generate a voltage and current by an electrochemical reaction between hydrogen and oxygen. The electric generator includes at least one unit cell for generating the electric energy, and the plurality of unit cells can have a stacked structure.

In the PEMFC with this configuration, the fuel stored in the fuel container is supplied to the reformer, the reformer reforms the fuel to produce hydrogen, and the electric generator generates the electric energy by the electrochemical reaction between hydrogen and oxygen.

The reformer not only changes a mixture of the fuel and water into reformed gas containing abundant hydrogen by a reforming reaction, but also removes carbon monoxide included in the reformed gas and capable of poisoning a catalyst of a fuel cell. Thus, the reformer generally includes a reforming reactor to produce the reformed gas containing abundant hydrogen by reforming the fuel, and a CO remover to remove carbon monoxide from the reformed gas. For example, the reforming reactor reforms the fuel into the reformed gas containing abundant hydrogen by a catalyst reaction such as steam reforming (SR), partial oxidation (POX), auto thermal reforming (ATR), etc. Further, the CO remover removes carbon monoxide from the reformed gas by a catalyst reaction such as water gas shift (WGS), preferential CO oxidation (PROX), etc., by refining hydrogen through a separating film, and the like.

The foregoing catalyst reactions can occur under a catalyst activation temperature, and thus a separate heat source is generally provided in the reformer to supply heat to the reformer. In general, the SR catalyst reaction requires a high catalyst activation temperature of 600° C.~800° C., so that it takes a relatively long time to perform preheating and initial operations. However, hydrogen obtained by the SR reaction has high purity, i.e., contains small impurities such as carbon monoxide. On the other hand, the ATR catalyst reaction is performed by burning the fuel, so that it is possible to use heat generated during the combustion. Thus, it takes a relatively short time to perform preheating and initial operations. However, hydrogen obtained by the ATR catalyst reaction has low purity, i.e., contains a lot of impurities such as carbon monoxide.

Figure 3:
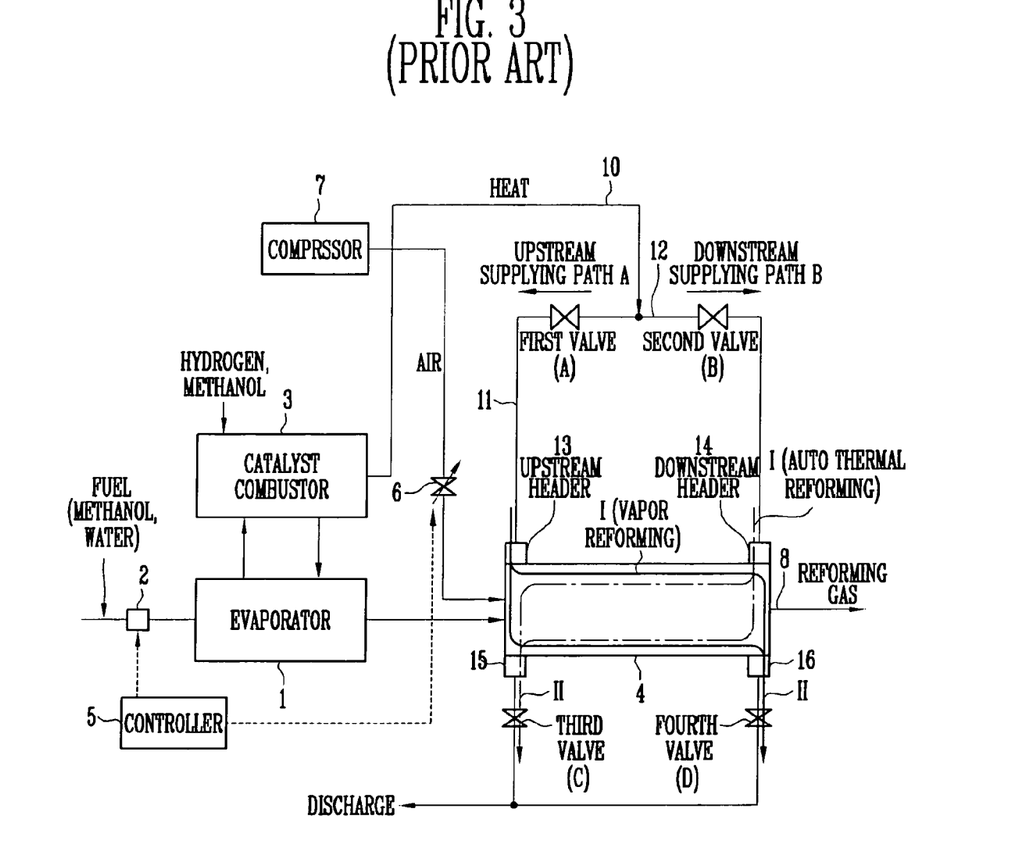
FIG. 3 is a schematic view of a conventional reformer.

According to a conventional reformer, as seen in FIG. 3, heated gas within a heat exchange reformer 4 flows in parallel with the flow of the fuel gas by a controller 5. A first valve A and a second valve B are used as a gas flow direction shifting means. In the case of the endothermic SR reaction, the first valve is open to perform the heat exchange in the inlet side of the reformer so that the fuel gas is heated, thereby enhancing the effect of the SR reaction. On the other hand, the heated gas within the heat exchange reformer 4 flows in a counter direction to the fuel gas supplied by the controller 5 by opening the second valve. This is because the ATR reaction includes an exothermic reaction to upstream fuel gas, and there is an endothermic reaction to downstream fuel gas, and thus the downstream addition enhances the effect of the ATR reaction. To supply the first valve and/or the second valve, the heated gas is generated by burning methanol in a catalyst combustor 3. However, in the conventional reformer, because the heated gas is used for heating the reformer, heat transfer efficiency is likely to be lowered, and the reformer may be contaminated with foreign materials produced after burning methanol.

SUMMARY OF THE INVENTION

Accordingly, one embodiment of the present invention provides a reformer which contacts and faces a heat source, and receives heat from the heat source, and which has a catalyst performing an ATR catalyst reaction and an SR catalyst reaction according to the type of reaction material introduced into the reforming reactor.

Another embodiment of the present invention provides a reformer including: a reforming reactor having a catalyst capable of performing an ATR catalyst reaction and an SR catalyst; a heat source contacting one side of the reforming reactor and providing the reforming reactor with heat; and an air feeder to preferentially feed the reforming reactor with air by an air flow control unit.

According to an embodiment of the invention, the catalyst includes a support metal such as platinum (Pt), palladium (Pd) or the like.

According to an embodiment of the invention, the air flow control unit includes a first valve placed in front of the reforming reactor. Further, the reformer includes a CO remover connected to and communicating with the reforming reactor and removing carbon monoxide, wherein the CO remover includes a water gas shift unit for a water gas shift catalyst reaction and a preferential oxidation unit for a preferential oxidation catalyst reaction.

According to one embodiment of the invention, the reformer includes a channel shifting unit allowing the reformed gas to flow toward the water gas shift unit and the preferential oxidation unit when the ATR catalyst reaction occurs in the reforming reactor. On the other hand, the reformer includes a channel shifting unit allowing the reformed gas to flow toward the preferential oxidation unit when the SR catalyst reaction occurs in the reforming reactor. Further, the channel shifting unit includes a second valve placed in front of the preferential oxidation unit, and a third valve placed in front of the water gas shift unit.

According to an embodiment of the invention, the reforming reactor is provided with a temperature sensor to sense temperature. Here, the reformer includes a controller that controls the first and third valves to be opened and the second valve to be closed when the temperature sensed by the temperature sensor is lower than a steam reforming catalyst activation temperature, and controls the first and third valves to be closed and the second valve to be opened when the temperature sensed by the temperature sensor is equal to and higher than the steam reforming catalyst activation temperature.

According to another embodiment of the invention, the air feeder feeds the heat source with air, and the heat source generates heat by burning combustion fuel.

Another embodiment of the present invention provides a method for operating a reformer, comprising: producing hydrogen by an auto-thermal reforming catalyst reaction while reaction material including fuel, water and air containing oxygen is supplied to the reforming reactor; and stopping the supply of air containing oxygen for starting a steam reforming catalyst reaction.

According to another embodiment of the invention, the stopping step is performed when the temperature of the reforming reactor is higher than a reference temperature.

According to another embodiment of the invention, the stopping step is performed after a period of time has passed.

According to an embodiment of the invention, the reference temperature includes a steam reforming catalyst activation temperature.

According to an embodiment of the invention, the method further comprises a step of supplying hydrogen produced by the first step to a preferential oxidation unit via a water gas shift unit.

According to an embodiment of the invention, the method further comprises a step of supplying hydrogen produced by the second step to the preferential oxidation unit.

BRIEF DESCRIPTION OF THE DRAWINGS

The invention will become apparent and more readily appreciated from the following description of exemplary embodiments, taken in conjunction with the accompanying drawings of which.

DETAILED DESCRIPTION

Hereinafter, embodiments of the present invention will be described with reference to accompanying drawings, wherein like numerals refer to like elements.

In the following embodiments, fuel refers to materials such as methanol, natural gas, butane, etc., which contain hydrogen and produces hydrogen by a reforming process. Some of fuel is mixed with water or air and used as a reforming fuel to be reformed as hydrogen. The other portion of the fuel is used as a combustion fuel to supply heat energy for heating a reforming reactor and a CO remover up to catalyst activation temperatures. Particularly, in the case of using butane as the fuel, vaporized fuel is automatically discharged from a butane fuel container when a nozzle of the butane fuel container is opened, so that the fuel can be supplied to a fuel cell system without a separate fuel feeder. Further, heat of combustion is so high that the fuel can be used in heating the reformer. Meanwhile, an oxidant includes pure oxygen stored in a separate storing means or oxygen containing air. Below, oxygen in the air will be used as the oxidant.

Figure 1:
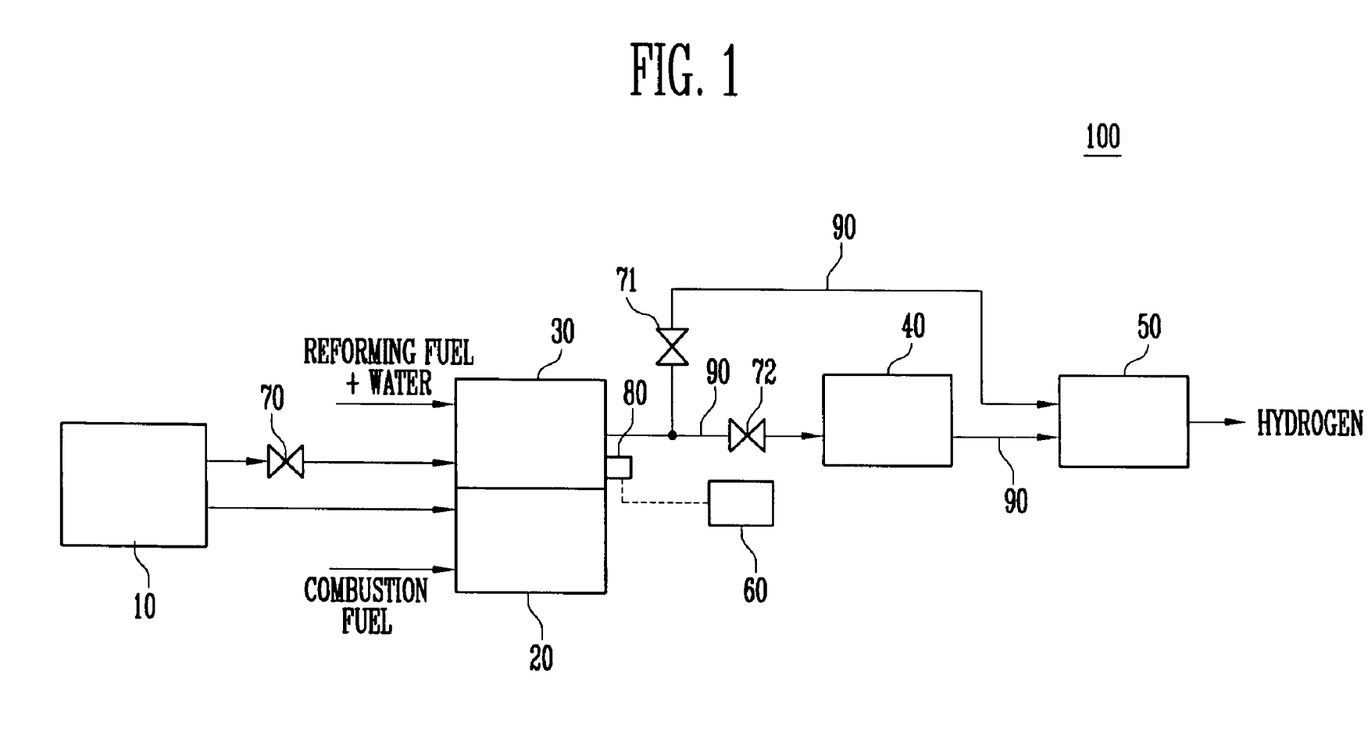
FIG. 1 is a schematic view of a reformer according to an embodiment of the present invention.

Referring to FIG. 1, a reformer 100 according to an embodiment of the present invention includes an air feeder 10, a heat source 20, a reforming reactor 30, a water gas shift unit 40, a preferential oxidation unit 50, a controller 60, a first valve 70, a second valve 71, a third valve 72 and a temperature sensor 80.

The air feeder 10 feeds the heat source 20 and the reforming reactor 30 with air, and it can be implemented by a common blower or the like. While the reformer 100 operates, the air feeder 10 continuously supplies air to the heat source 20, but preferentially supplies air to the reforming reactor 30 by controlling the first valve 70.

The heat source 20 burns the combustion fuel using oxygen contained in the air supplied from the air feeder 10. The heat generated during the combustion is transferred to the reforming reactor 30.

The reforming reactor 30 has one side in contact with the heat source 20, and the other side provided with a temperature sensor 80, thereby sensing the temperature of the reforming reactor 30. Further, the reforming reactor 30 is provided with a catalyst capable of performing an ATR catalyst reaction and a SR catalyst reaction according to the type of reaction material introduced into the reforming reactor 30. Hydrogen containing fuel, water and air may be used for the ATR catalyst reaction as the reaction material, whereas hydrogen containing fuel and water may be used for the SR catalyst reaction as the reaction material. The catalyst includes support metal such as platinum (Pt), palladium (Pd), or the like. Furthermore the catalyst may include one catalyst or a mixture of at least two catalysts for both catalyst reactions as described above. In an embodiment where the temperature of the reforming reactor 30 is lower than a SR catalyst activation temperature of 600° C.~800° C., the catalyst performs the ATR catalyst reaction while air containing oxygen together with reforming fuel and water are supplied to the reforming reactor 30. However, where the temperature of the reforming reactor 30 is equal to and higher than the SR catalyst activation temperature, the first valve 70 is closed and the reforming fuel and water are supplied to the reforming reactor 30, and the catalyst performs the SR catalyst reaction. Thus, while the reformer 100 operates, the reforming reactor 30 is continuously fed with the reforming fuel and water, but preferentially fed with air from the air feeder 10 according to the open/close action of the first valve 70.

The reforming reactor 30 reforms the reforming fuel by the ATR catalyst reaction or the SR catalyst reaction, and produces reformed gas containing abundant hydrogen. Here, the ATR catalyst reaction is an exothermic reaction, so that time to preheat the reformer up to the catalyst activation temperature is reduced, thereby shortening the initial operations time. Therefore, while the reformer 100 is initially driven, the reforming reactor 30 is fed with air, and thus the ATR catalyst reaction between the reforming fuel, water and air occurs. Then, the temperature of the reforming reactor 30 continuously increases by heat based on the ATR catalyst reaction and heat transferred from the heat source 20. When the temperature sensor 80 senses that the temperature of the reforming reactor 30 reaches the SR catalyst activation temperature, the first valve 70 is closed and air is not supplied from the air feeder 10 to the reforming reactor 30. Then, the SR catalyst reaction between the reforming fuel and water occurs, thereby producing the reformed gas with abundant hydrogen.

The reformed gas produced in the reforming reactor 30 is supplied to the water gas shift unit 40 and the preferential oxidation unit 50 through a reforming gas channel 90 formed in the reforming reactor. The reforming gas channel 90 is branched, and thus has one end connected to the preferential oxidation unit 50 via the second valve 71 and the other end connected to the water gas shift unit 40 and the preferential oxidation unit 50 via a third valve 72. Here, the water gas shift unit 40 and the preferential oxidation unit 50 perform a water gas shift catalyst reaction and a preferential oxidation catalyst reaction, respectively. In an embodiment, the water gas shift catalyst reaction can reduce the amount of carbon monoxide contained in the reformed gas by 1%~5%, and the preferential oxidation catalyst reaction can reduce the concentration of carbon monoxide contained in the reformed gas to 50 ppm or below. Thus, in the case where a relatively large amount of carbon monoxide is contained in the reformed gas, carbon monoxide is first removed from the reformed gas by the water gas shift catalyst reaction and removed again by the preferential oxidation catalyst reaction. On the other hand, in the case where a relatively small amount of carbon monoxide is contained in the reformed gas, carbon monoxide is removed from the reformed gas by only the preferential oxidation catalyst reaction. Meanwhile, the heat needed for these catalyst reactions can be directly or indirectly supplied from the heat source 20 or from an additional heat source.

The reformed gas produced by the ATR catalyst reaction in the reforming reactor 30 contains a relatively large amount of carbon monoxide. Therefore, in the case where the reforming reactor 30 undergoes the ATR catalyst reaction, the second valve 71 is closed and the third valve 72 is opened, so that the reformed gas produced by the ATR catalyst reaction is supplied to the water gas shift unit 40. The water gas shift unit 40 performs the water gas shift catalyst reaction to primarily reduce carbon monoxide contained in the reformed gas, and supplies the reformed gas to the preferential oxidation unit 50. Then, the preferential oxidation unit 50 performs the preferential oxidation catalyst reaction, so that carbon dioxide contained in the reformed gas is secondarily reduced, thereby producing high purity hydrogen with minimal carbon monoxide.

On the other hand, the reformed gas produced by the SR catalyst reaction in the reforming reactor 30 contains a relatively small amount of carbon monoxide. Therefore, in the case where the reforming reactor 30 undergoes the SR catalyst reaction, the second valve 71 is opened and the third valve 72 is closed, so that the reformed gas produced by the SR catalyst reaction is directly supplied to the preferential oxidation unit 50. In the preferential oxidation unit 50, the preferential oxidation catalyst reaction is performed to reduce the amount of carbon monoxide contained in the reformed gas, thereby producing high purity hydrogen with minimal carbon monoxide.

In an embodiment, a controller 60 is provided to open and close the first valve 70, the second valve 71 and the third valve 72 depending on temperatures sensed by the temperature sensor 80. That is, the controller 60 receives a signal corresponding to the temperature of the reforming reactor 30 sensed by the temperature sensor 80, and outputs a control signal for opening the first valve 70 and the third valve 72 and closing the second valve 71 when the reformer 100 is initially driven with a relatively low temperature. Then, in one embodiment when the temperature sensor 80 senses that the reforming reactor 30 is preheated to have a temperature of 600° C.~800° C., the controller 60 outputs a control signal for closing the first and third valves 70 and 73 and opening the second valve 71.

On the other hand, the controller 60 may be provided to control the first valve 70, the second valve 71 and the third valve 72 after a period of time for preheating the reformer in the range of 600° C.~800° C. has passed.

Figure 2:
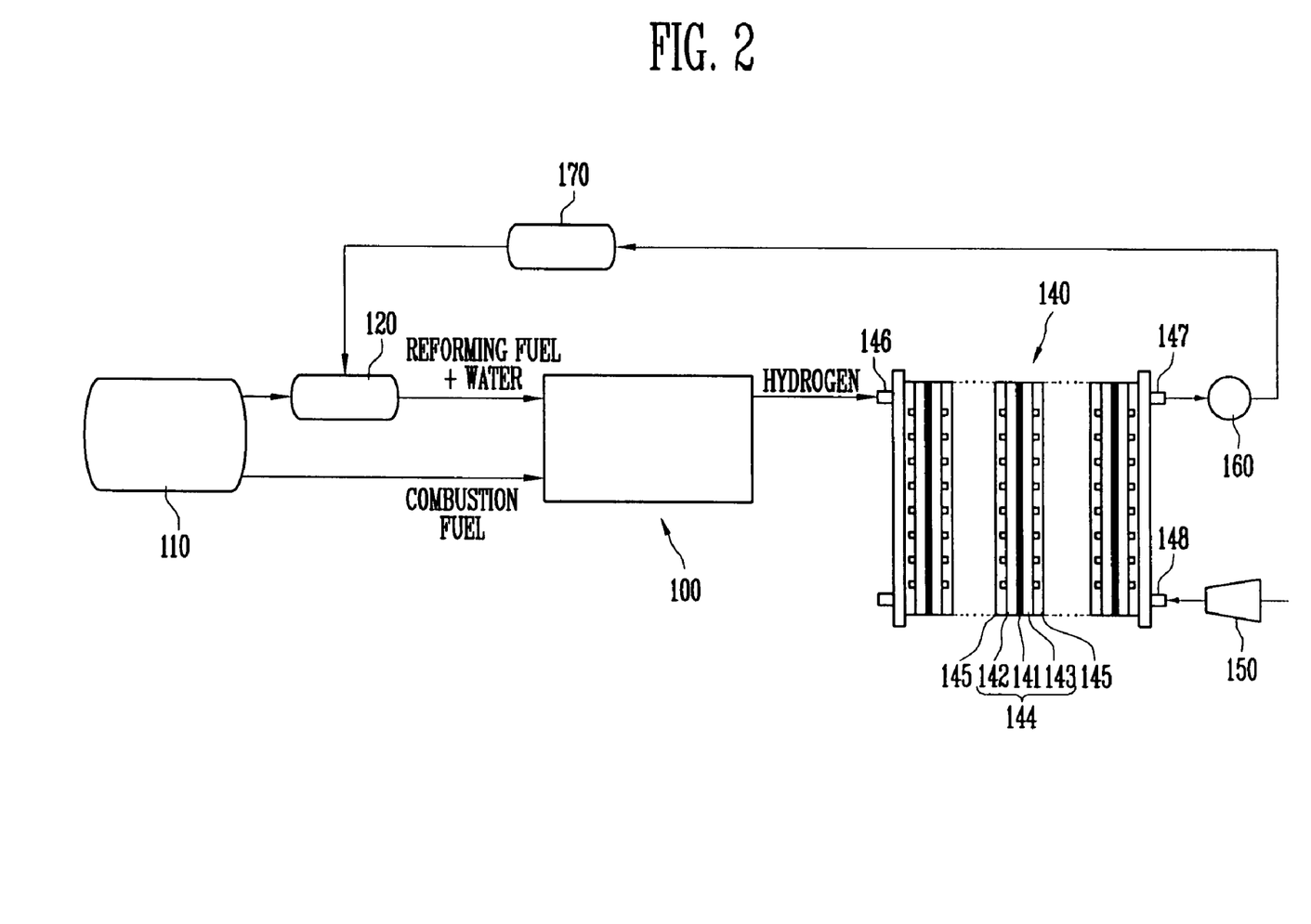
FIG. 2 is a schematic view of a PEMFC system employing the reformer according to an embodiment of the present invention.

FIG. 2 is a schematic view of a PEMFC system employing the reformer according to an embodiment of the present invention.

Referring to FIG. 2, a PEMFC system employing the reformer 100 according to an embodiment of the present invention includes a fuel feeder 110, a fuel mixer 120, the reformer 100, an electric generator 140, a blower 150, a condenser 160 and a water storage container 170.

In the fuel mixer 120, raw fuel stored in the fuel feeder 110 and water stored in the water storage container 170 are mixed to provide mixed fuel.

The reformer 100, as described above, reforms the mixed fuel by the water gas shift catalyst reaction, the ATR catalyst reaction or the like into the reformed gas containing abundant hydrogen. Then, carbon monoxide is removed from the reformed gas by a WGS catalyst reaction, a POX catalyst reaction or the like, thereby producing hydrogen with high concentration and high purity.

The electric generator 140 generates electric energy using the electrochemical reaction between hydrogen reformed by the reformer 100 and oxygen in air introduced by the blower 150. The electric generator 140 includes a membrane electrode assembly 144 to oxidize hydrogen and reduce oxygen, and a bipolar plate 145 to supply the membrane-electrode assembly 144 with hydrogen and oxygen. In general, the membrane electrode assembly 144 has a structure with an electrolyte membrane 141 interposed between an anode electrode 142 and a cathode electrode 143, which form opposite sides of the membrane-electrode assembly 144.

With this configuration, hydrogen is introduced into the electric generator 140 through an anode inlet 146, and supplied to the anode electrode 142 via the bipolar plate 145 adjacent to the anode electrode 142. Further, oxygen in air is introduced into the electric generator 140 through a cathode inlet 148, and supplied to the cathode electrode 143 via the bipolar plate 145 adjacent to the cathode electrode 143. Further, products in the cathode electrode 143 move along the bipolar plate 145 adjacent thereto and are discharged to the outside of the electric generator 140 through a cathode outlet 147.

The electrochemical reactions occurring in the electric generator 140 can be represented by the following reaction formula 1.

Reaction Formula 1

Anode: $H_2 \rightarrow 2H^+ + 2e^-$

Cathode: $\frac{1}{2}O_2 + 2H^+ + 2e^- \rightarrow H_2O$

Total: $H_2 + \frac{1}{2}O_2 \rightarrow H_2O + \text{electric current} + \text{heat}$ Further, the cathode outlet 147 of the electric generator 140 is provided with the condenser 160, so that high temperature water discharged from the cathode outlet 147 is condensed into water and moves and is stored in the water storage container 170. Water stored in the water storage container 170 is supplied to the fuel mixer 120.

According to an embodiment of the present invention, heat needed for the catalyst reactions is directly transferred from the heat source contacting the reformer to the reformer, so that time taken to preheat the reformer can be reduced as compared with that taken in indirectly heating the reformer. Further, the ATR catalyst reaction featuring in a relatively short preheating time is performed while the reformer is initially driven, so that hydrogen can be produced when the reformer is initially operated, thereby efficiently operating the fuel cell. Also, the process of reducing carbon monoxide is performed individually in the ATR catalyst reaction and the SR catalyst reaction, thereby efficiently producing hydrogen with high purity.

Although several embodiments of the present invention have been shown and described, it would be appreciated by those skilled in the art that changes might be made without departing from the principles and spirit of the invention, the scope of which is defined in the claims and their equivalents.

What is claimed is:

1. A reformer comprising:
   a reforming reactor adapted to reform a hydrogen containing fuel into reformed gas having abundant hydrogen with a catalyst capable of performing an auto thermal reforming (ATR) catalyst reaction and an steam reforming (SR) catalyst reaction;
   a heat source contacting one side of the reforming reactor and for providing the reforming reactor with heat;
   an air feeder adapted to feed the reforming reactor with air by an air flow control unit;
   a CO remover connected to and communicating with the reforming reactor, adapted to remove carbon monoxide, and comprising a water gas shift unit adapted to perform a water gas shift catalyst reaction and a preferential oxidation unit adapted to perform a preferential oxidation catalyst reaction;
   a channel shifting unit comprising a first valve between the reforming reactor and the preferential oxidation unit, and a second valve between the reforming reactor and the water gas shift unit; and
   a controller programmed to open the first valve and close the second valve to allow a reformed gas to flow to the preferential oxidation unit and bypass the water gas shift unit during operation of the SR catalyst reaction.

2. A reformer comprising:
   a reforming reactor having a catalyst capable of performing an auto thermal reforming (ATR) catalyst reaction and an steam reforming (SR) catalyst reaction;
   a heat source contacting one side of the reforming reactor and for providing the reforming reactor with heat;
   an air feeder adapted to feed the reforming reactor with air by an air flow control unit, the air flow control unit comprising a first valve between the air feeder and the reforming reactor;
   a CO remover connected to and communicating with the reforming reactor and adapted to remove carbon monoxide, the CO remover comprising a water gas shift unit adapted to perform a water gas shift catalyst reaction and a preferential oxidation unit adapted to perform a preferential oxidation catalyst reaction;
   a channel shifting unit comprising a second valve between the reforming reactor and the preferential oxidation unit, and a third valve between the reforming reactor and the water gas shift unit; and
   a controller programmed to open the first valve when a temperature in the reforming reactor is below an SR catalyst activation temperature to allow the ATR catalyst reaction to occur, to close the first valve to prevent air flow to the reforming reactor and stop the ATR catalyst reaction when the SR catalyst activation temperature has been reached in the reforming reactor, to close the second valve and open the third valve to allow the reformed gas to flow to the water gas shift unit and the preferential oxidation unit when the ATR catalyst reaction occurs, and to open the second valve and close the third valve to allow a reformed gas to flow to the preferential oxidation unit and bypass the water gas shift unit when the SR catalyst reaction occurs in the reforming reactor.

3. The reformer according to claim 2, wherein the reforming reactor is provided with a temperature sensor adapted to sense temperature.

4. The reformer according to claim 3, wherein the controller is programmed to control the first and third valves to be opened and the second valve to be closed when the temperature sensed by the temperature sensor is lower than a steam reforming catalyst activation temperature, and to control the first and third valves to be closed and the second valve to be opened when the temperature sensed by the temperature sensor is equal to or higher than the steam reforming catalyst activation temperature.

5. The reformer according to claim 4, wherein the air feeder feeds the heat source with air, and the heat source generates heat by burning combustion fuel.

6. The reformer according to claim 2, wherein the catalyst includes platinum (Pt) or palladium (Pd) support metal.

7. A fuel cell system comprising:
   a fuel feeder adapted to store and supply raw fuel;
   a reformer adapted to generate hydrogen from the raw fuel;
   a blower adapted to supply air;
   an electric generator adapted to generate electricity by an electrochemical reaction between hydrogen and oxygen in air; and
   a water storage container adapted to supply water to the reformer,
   wherein the reformer comprises:
   a reforming reactor having a catalyst for performing an auto thermal reforming (ATR) catalyst reaction and an steam reforming (SR) catalyst reaction;
   a heat source contacting one side of the reforming reactor and for providing the reforming reactor with heat;
   an air feeder adapted to feed the reforming reactor with air by an air flow control unit, the air flow control unit comprising a first valve between the air feeder and the reforming reactor;
   a CO remover connected to and communicating with the reforming reactor and adapted to remove carbon monoxide, the CO remover comprising a water gas shift unit adapted to perform a water gas shift catalyst reaction and a preferential oxidation unit adapted to perform a preferential oxidation catalyst reaction;
   a channel shifting unit comprising a second valve between the reforming reactor and the preferential oxidation unit, and a third valve between the reforming reactor and the water gas shift unit; and
   a controller programmed to open the first valve when a temperature in the reforming reactor is below an SR catalyst activation temperature to allow the ATR catalyst reaction to occur, to close the first valve to prevent air flow to the reforming reactor and stop the ATR catalyst reaction when the SR catalyst activation temperature has been reached in the reforming reactor, to close the second valve and open the third valve to allow a reformed gas to flow to the water gas shift unit and the preferential oxidation unit when the ATR catalyst reaction occurs, and to open the second valve and close the third valve to allow the reformed gas to flow to the preferential oxidation unit and bypass the water gas shift unit when the SR catalyst reaction occurs in the reforming reactor.

8. The fuel cell according to claim 7, wherein the reforming reactor is provided with a temperature sensor adapted to sense temperature.

9. The fuel cell according to claim 8, wherein the controller is programmed to control the first and third valves to be opened and the second valve to be closed when the temperature sensed by the temperature sensor is lower than a steam reforming catalyst activation temperature, and to control the first and third valves to be closed and the second valve to be opened when the temperature sensed by the temperature sensor is equal to or higher than the steam reforming catalyst activation temperature.

10. The fuel cell according to claim 9, wherein the air feeder feeds the heat source with air, and the heat source generates heat by burning combustion fuel.

11. The fuel cell according to claim 7, wherein the catalyst includes platinum (Pt) or palladium (Pd) support metal.

12. The reformer of claim 2, wherein the SR catalyst activation temperature is between 600° C. and 800° C.

13. The reformer of claim 2, wherein the heat source is adapted to operate during the SR reaction to keep the temperature in the reforming reactor up to or at the SR catalyst temperature.

* * * * *

UNITED STATES PATENT AND TRADEMARK OFFICE
CERTIFICATE OF CORRECTION

| | | |
|---|---|---|
| PATENT NO. | : 7,838,161 B2 | Page 1 of 1 |
| APPLICATION NO. | : 11/595339 | |
| DATED | : November 23, 2010 | |
| INVENTOR(S) | : Sung Chul Lee et al. | |

It is certified that error appears in the above-identified patent and that said Letters Patent is hereby corrected as shown below:

In the Claims

Column 7, Claim 1, line 32        Delete "an" Insert -- a --

Column 7, Claim 2, line 55        Delete "an" Insert -- a --

Column 8, Claim 7, line 48        Delete "an" Insert -- a --

Signed and Sealed this
Seventh Day of February, 2012

David J. Kappos
*Director of the United States Patent and Trademark Office*